United States Patent Office 3,459,980
Patented Aug. 5, 1969

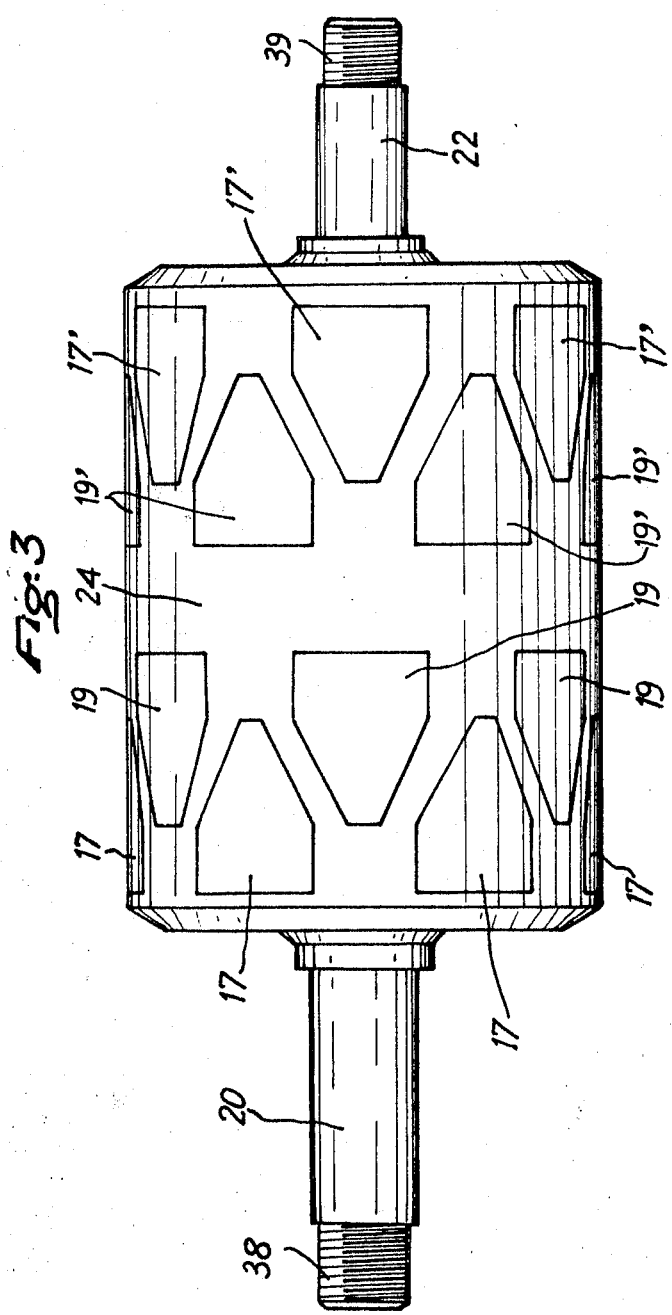

3,459,980
PERMANENT MAGNET ALTERNATOR
WITH MULTIPLE ROTOR
Pierre Coroller, Grenoble, France, assignor to Societe
d'Etudes et de Recherches Magnetiques (Sermag), Saint-
Martin d'Heres (Isere)
Filed Dec. 27, 1967, Ser. No. 693,809
Int. Cl. H02k 21/10, 23/60
U.S. Cl. 310—114                                    1 Claim

ABSTRACT OF THE DISCLOSURE

An alternator includes at least two permanent magnet rotor portions of drum-like configuration. The terminal and intermediate claw-tooth pole pieces, made of soft magnetic material are used to enclose the rotor portions. Each pole piece includes a plurality of outwardly directed projections which terminate near the inner portions of the respective stator rings of the alternator unit. A non-magnetic light metal alloy is used to fill the gaps between the pole pieces and the rotor portion.

---

The invention relates to alternators comprising several rotors, each of said rotors being built using a permanent magnet.

The use of this type of alternator is particularly contemplated for the production of electric power in automobile vehicles, in particular in utilitarian vehicles, this application not being restrictive. When, for example, an autonomous automobile vehicle for terrestrial, nautical, maritime or aerial use is to be equipped with an alternator, it is advantageous that the diameter of said alternator be of the same order of size as that of dynamos currently used at present for this application. In this case, indeed, no important modifications are to be made in the general arrangement of the mechanical components of the vehicle and, moreover, if the alternator rotor has the same dimensions as the rotor of the corresponding dynamo, a certain number of components available on the market, particularly stators wound to the automatic machine, currently produced in mass production for making dynamos, may be used, which is advantageous as far as cost price is concerned.

It is therefore necessary that alternators, to be substituted for dynamos in the present construction of automobile vehicles, have a shape similar to that of said dynamos, i.e., the shape of an elongated cylinder of relatively small diameter. Now, the use of a magnet under optimum conditions usually leads to a shape different from that desired, i.e. that of a cylinder of reduced length and comparatively large diameter. Various solutions have already been proposed for the construction of an alternator rotor using a permanent magnet or a group of permanent magnets. One of them disclosed in the U.S. Patent No. 3,181,018, granted to R. J. Shafranek et al., consists in building the rotor using a magnetized bar whose longitudinal axis is laid out along the alternator axis, the magnetization of said magnetized bar being perpendicular to its longitudinal axis and, as a result, to said alternator axis, so that said magnetized bar constitutes a two-pole rotor whose north and south poles move successively past the front of each of the stator windings, thus provoking therein the creation of an alternating current. Another construction of the same type is described in French Patent No. 1,176,490 granted to Radovan Nedeljkovitch; it provides for building the rotor by associating a certain number of elementary permanent magnets that are stacked up and placed side by side, which makes it possible to obtain, in the rotor volume occupied by the stator, a distribution of the magnetic field corresponding to a high purity of the current produced, i.e. a sine-wave current comprising a very small harmonic ratio; this second construction is also based on permanent magnets whose axis of magnetization is perpendicular to the rotor axis, so that when the magnetized unit, consisting of assembly of permanent magnets placed side by side, rotates around the rotor axis, its north and south poles successively move past the front of each of the stator windings and provoke at that point the creation of an alternating current.

The drawback of these solutions is that, since the north pole and the south pole pass only once per turn in front of each stator winding, it is necessary to cause the rotor to rotate at a high speed in order to obtain an alternating current at the required frequency, i.e. 3,000 turns/minute, in order to obtain a current of 50 cycles/second, as indicated in French Patent 1,176,490, respectively 24,000 turns/minute in order to obtain a current of 400 cycles/second as indicated in U.S. Patent 3,181,018, this 400 cycle current being, as is well known, extensively used in utilitarian vehicles, particularly aboard airplanes. This high speed of rotation causes the construction and maintenance of an alternator of this type to be delicate and costly, especially when high power values are desired.

It has also been suggested, in order to obtain a high power alternator, but of moderate diameter, to construct said alternator by incorporating into it, two rotors placed end to end on the same shaft and two stators, placed side by side as well, so as to surround the two rotors, said stators having their windings electrically connected in parallel so that the electromotive forces generated in each one of said windings are additive. In such constructions, both rotors are generally multipolar and are made of a magnetically permeable material which is magnetized through the action of a continuous current passing in at least one coil fastened onto the rotor itself or onto a part magnetically connected, across an air gap, to said rotor.

These solutions have the disadvantage of comprising the feeding of a continuous current which may involve failures and which complicates the mechanical construction of the device.

It has also been suggested, in an alternator including two rotor-stator assemblies, in order to constitute a rotor axis, to use a magnet whose magnetization is directed in the direction of said axis, and to use the magnetic flux of said magnet to create, using multipolar pole pieces, a suitable magnetic field in the two rotor volumes occupied by the two stators. This solution involves several drawbacks. First, it is difficult to provide an axis, which is necessarily long, and which should have a high mechanical strength, using a material adapted to give a high performance permanent magnet.

Moreover, the very elongated form of the permanent magnet which results from this solution, if a diameter as small as necessary is to be maintained in the alternator, does not correspond to the use of said permanent magnet under optimum conditions.

Finally, the magnetic circuits comprise two interruptions per air gap for each stator, i.e. a total of four interruptions per air gap, which decreases the efficiency of the flux produced by the permanent magnet and which practically prevents the generalization of the process to a larger number of rotor-stator assemblies placed end to end in a same alternator.

Therefore, it is an object of the present invention to provide a high power alternator free of the above drawbacks, easy to build, using permanent magnets as rotors and having a shape which is approximately the same as that of dynamos of the same power, and, therefore, capable of replacing, without any difficulties, said dynamos in all their aplications, in particular, in utilitarian automobile vehicles.

It is another object of the invention to provide an alternator assembly comprising at least two assembled permanent magnet rotor means mounted for rotation on a longitudinal axis and an equal number of stator means respectively encircling the respective rotor means for generating an electric current in response to rotation of the rotor means, each of the rotor means including a cylindrical permanent magnet block having a direction of magnetization parallel to the said axis, intermediate pole pieces between the respective permanent magnet blocks and terminal pole pieces, said terminal and intermediate pole pieces being made of a soft magnetic material and each comprising a substantially plane central portion and a plurality of upturned finger-shaped projections, the central plane portions abutting against the end surfaces of the permanent magnet blocks, the respective fingers of each pole piece making up as many poles of the same nature as the pole of the permanent magnet block against which the pole piece is abutting, the said pole pieces forming pairs, each of the fingers of one of the pole pieces of each pair, being set into the spaces between two adjacent fingers of the other pole piece of the pair, while being magnetically insulated therefrom, whereby the pair provides a lateral wrapping of the permanent magnet which it frames, said fingers extending radially in the direction of the stator in such a manner that an air gap is provided between each one of said fingers and the stator, a non-magnetic light metal alloy being cast in the interstices between the adjacent fingers and between the fingers and the permanent magnet blocks, and two stub shafts secured to the said terminal pole pieces for mounting the rotor means for rotation on said longitudinal axis.

Other objects, features and advantages of the present invention will become apparent from the following description.

In the accompanying drawings:

FIGURE 3 is an elevational view of the rotor unit with which this alternator is provided.

Figure 2:
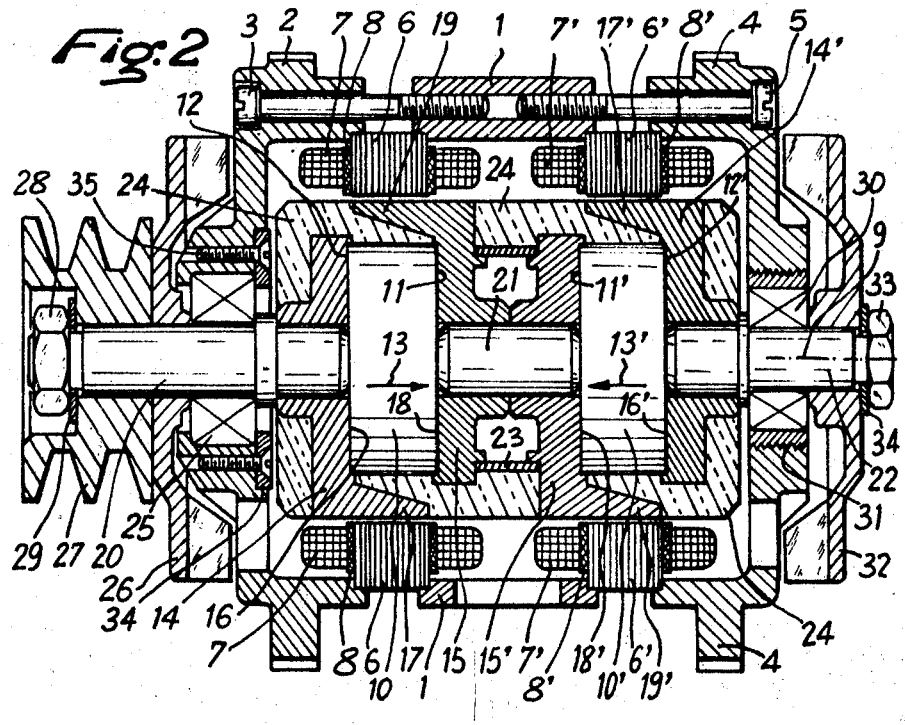
FIGURE 2 is a section taken along the line ABC of FIGURE 1.

FIGURE 2 shows an alternator assembly comprising a chassis consisting of a body 1, a forward flange 2, fastended to body 1 with bolts 3 and of a rear flange 4, fastened to body 1 with bolts 5. Two stators are set inside this chassis, the first one consisting of a ring 6 made of a laminated soft magnetic material carrying a winding 7 and of protecting belts 8 and the second one consisting of a ring 6′, identical to ring 6, carrying a winding 7′ identical to winding 7, and of protecting belts 8′.

A rotor unit assembling two rotors is placed along axis 9 of the alternator. The first rotor consists of a permanent magnet 10 shaped into a right cylinder, ending with plane faces 11 and 12 whose magnetization is directed in the direction of arrow 13 and which is enclosed between terminal pole piece 14 and intermediate pole piece 15. The second rotor consists of a permanent magnet 10′ identical to magnet 10, ending with plane faces 11′ and 12′, whose magnetization is directed in the direction of arrow 13′ and which is enclosed between terminal pole piece 14′ and itnermediate pole piece 15′.

The terminal pole piece 14 comprises a plane face 16 which lies against plane face 12 of magnet 10 and a certain number of fingers such as 17, making up as many poles which laterally enclose magnet 10.

Intermedaite pole piece 15 simiilarly has a plane face 18 which lies against plane face 11 of magnet 10 and a certain number of fingers such as 19, making up as many poles which laterally enclose magnet 10.

The fingers such as 17 of terminal pole piece 14 and such as 19 of intermediate pole piece 15 preferably have a truncated pyramidal shape and upon assembly, pole pieces 14 and 15 are arranged so that the fingers from the one are housed in the spaces between the fingers of the other. Furthermore, a stud shaft 20 is crimped onto terminal pole piece 14 and intermediate pole piece 15 has a hole bored at its center in which is housed an extremity of cog 21.

Terminal pole piece 14′ is similar to terminal pole piece 14 and comprises, in particular, a plane face 16′ which lies against plane face 12′ of magnet 10′ and a certain number of fingers such as 17′, making up as many poles, which laterally enclose magnet 10′. Intermediate pole piece 15′ is similar to intermediate pole piece 15 and comprises, in particular, a plane face 18′ which lies against plane face 11′ of magnet 10′ and a certain number of fingers such as 19′ making up as many poles which laterally enclose magnet 10′.

The fingers, such as 17′, of terminal pole piece 14′ and such as 19′ of intermediate pole piece 15′ are preferably shaped in the form of a truncated pyramid and, upon assembly, pole pieces 14′ and 15′ are arranged so that the fingers of the one are housed in the spaces between the fingers of the other.

Furthermore, a stud shaft 22 is crimped onto terminal pole piece 14′ and intermediate pole piece 15′ has a hole bored at its center in which is housed the second extremity of cog 21. A hollow cylinder-shaped ring 23 unites the base of intermediate pole pieces 15 and 15′. Finally, the assembly consisting of the two magnets 10 and 10′ and of pole pieces 14, 14′, 15 and 15′ is embedded into a light non-magnetic metal alloy 24, deposited by casting, which plugs up all the interstices between the permanent magnets and the pole pieces as well as those between the fingers of the pole pieces. This alloy completes the sturdiness of the assembly, provides for magnetic insulation between the fingers of the various pole pieces and eliminates air turbulences between the fingers of the pole pieces upon rotation of the alternator. Furthermore, this alloy has the advantage of providing protection for the permanent magnet against the de-magnetizing field which might be produced as a result of transient phenomena.

Finally, this alloy prevents dust from depositing between the fingers of the pole pieces, which would be harmful to the proper operation of the alternator and makes it possible to carry out easily a gross adjustment upon final mechanical balancing of the rotor unit. The stud shaft 20 is mounted so as to rotate freely on forward flange 2 by means of a roller bearing 25 and it supports flywheel 26 annd driving pulley 27 fastened to it by bolt 28 and ring 29. Stud shaft 22 is mounted so as to rotate freely on rear flange 4 by means of a roller bearing 30 screwed along 31 into said rear flange and it supports flywheel 32 fastened to it by bolt 33 and ring 34.

Roller bearing 25 is maintained in a housing of forward flange 2 by means of a ring 34 fastened onto said forward flange by screws 35.

Finally, the body or chassis comprises holes such as 36 and 37 (FIG. 1) making it possible to fasten the alternator onto the apparatus which it is to supply.

Figure 1:
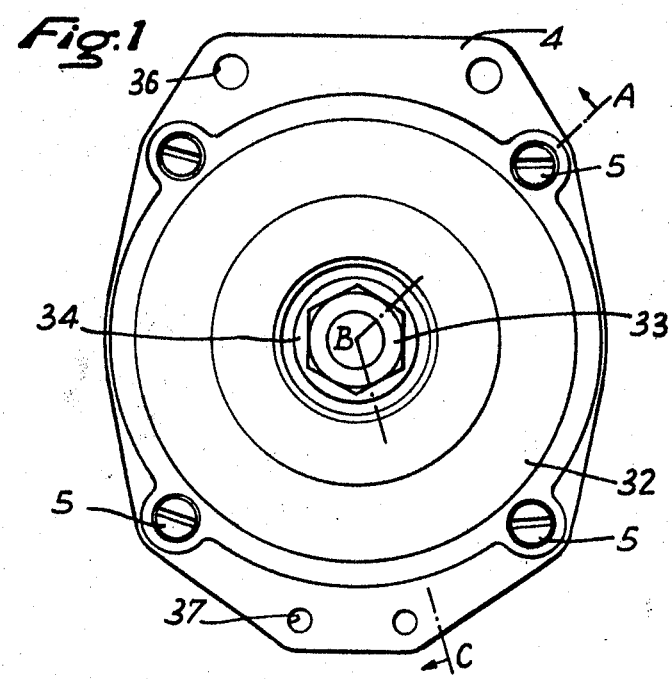
FIGURE 1 is an end view of an alternator assembly according to the invention.

FIGURE 3 is an outside view of the rotor unit illustrated in FIGURE 1. Fingers 17 of the first terminal pole piece and 17′ of the second terminal pole piece may be seen as well as fingers 19 of the first intermediate pole piece and 19′ of the second intermediate pole piece on an even level with the surface of alloy 24. The unit thus constituted by the two rotor means is supported by stud shaft 20, which is threaded at its extremity along 38 and by stud shaft 22, which is threaded at its extremity along 39 so as to make it possible to screw on bolts 28 and 33 respectively (FIGURE 2).

The operation of the alternator assembly is as follows:

The flux leaving the north pole of magnet 10 spreads out into fingers such as 19 of intermediate pole piece 15 and creates at the extremity of each of these fingers, a north pole: the flux crosses the air gap between finger 19 and the mass of ring 6 made of magnetic material and closes up again, across this mass, in a perpendicular direction to the plane of FIGURE 2, into fingers such as 17, located on either side of finger 19 and which are part of pole piece 14 in contact with the south pole of magnet 10. It follows that the alternation of fingers such as 19 and fingers such as 17 constitutes a succession of north and south poles which, as the rotor rotates, generate an alternating current in the stator windings. The process is the same with the second rotor means consisting of magnet 10' and fingers 19' and 17', but it will be noted that the magnetic circuits of the first rotor means and of the second rotor means are completely independent from each other and that each comprises two air gaps only.

It will be understood that many modifications and variations may be effected without departing from the spirit and scope of the invention.

What is claimed is:

1. An alternator assembly comprising at least two assembled permanent magnet rotor means mounted for rotation on a longitudinal axis and an equal number of stator means respectively encircling the respective rotor means for generating an electric current in response to rotation of the rotor means, each of the rotor means including a cylindrical permanent magnet block having a direction of magnetization parallel to the said axis, intermediate pole pieces between the respective permanent magnet blocks and terminal pole pieces, said terminal and intermediate pole pieces being made of a soft magnetic material and each comprising a substantially plane central portion and a plurality of upturned finger-shaped projections, the central plane portions abutting each of the end surfaces of the permanent magnet blocks, the respective fingers of each pole piece making up as many poles of the same nature as the pole of the permanent magnet block against which the pole piece is abutting, the said pole pieces forming pairs, each of the fingers of one of the pole pieces of each pair, being set into the spaces between two adjacent fingers of the other pole piece of the pair, while being magnetically insulated therefrom, whereby the pair provides a lateral wrapping of the permanent magnet which it frames, said fingers extending radially in the direction of the stator in such a manner that an air gap is provided between each one of said fingers and the stator, a non-magnetic light metal alloy being cast in the interstices between the adjacent fingers and between the fingers and the permanent magnet blocks, and two stub shafts secured to the said terminal pole pieces for mounting the rotor means for rotation on said longitudinal axis.

References Cited

UNITED STATES PATENTS

| 3,173,042 | 3/1965 | Fodor | 310—152 |
| 3,206,623 | 9/1965 | Snowdon | 310—156 |
| 3,289,021 | 11/1966 | Faure | 310—145 |
| 3,303,369 | 2/1967 | Erickson | 310—263 |
| 3,309,547 | 3/1967 | Woodward | 310—263 |

WARREN E. RAY, Primary Examiner

R. SKUDY, Assistant Examiner

U.S. Cl. X.R.

310—156, 262